Nov. 23, 1937.  G. F. McDOUGALL  2,099,939
SAMPLING VALVE
Original Filed May 11, 1937
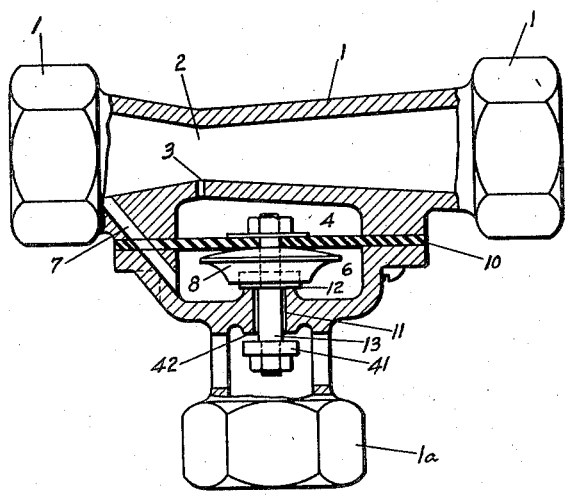
Fig. I
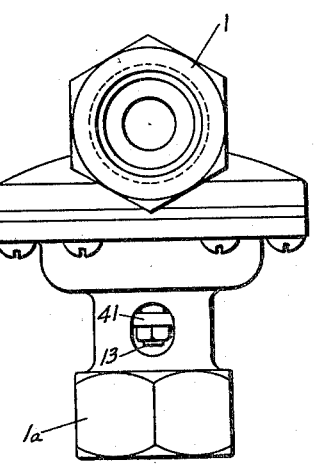
Fig. II
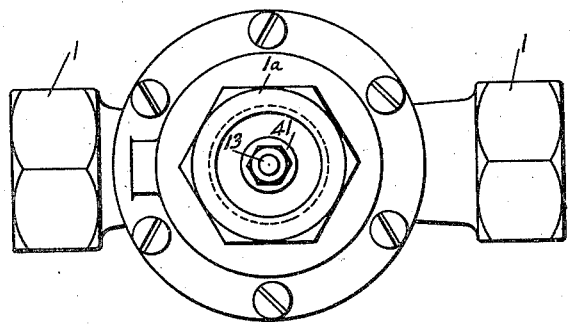
Fig. III
INVENTOR.
George F. McDougall Patented Nov. 23, 1937

2,099,939

UNITED STATES PATENT OFFICE 2,099,939

SAMPLING VALVE

George F. McDougall, Portland, Oreg.

Original application May 11, 1937, Serial No. 141,946. Divided and this application July 24, 1937, Serial No. 155,480

5 Claims. (Cl. 182—12)

This invention relates to sampling valves employing a Venturi tube that is effective to vary pressures on a movable member, such as a diaphragm, according to the disclosure in my copending application for Sampling valves, Serial No. 141,946, filed May 11, 1937, of which this is a divisional application.

The objects of the present invention are utilization of the free flow channel and positive action of the disclosure above referred to, for the purpose of operating a peculiar type of valve system to economize in the quantity of fluid extracted as a sample.

A further object is a valve arrangement that will move slowly under the influence of Venturi action on a diaphragm, to alternately bring one or the other of two valve elements of a double-beat valve into engagement with seats, at opposite ends of a flow channel, so that a timed emission of fluid can occur while the two elements of the double-beat valve are exchanging the function of closing the flow channel.

A further object is a hydraulic timing device that may be made to vary the time that both valves are off the valve seats.

These and other objects that will be apparent from this specification constitute the purpose of the present invention.

A drawing accompanies and forms a part of this specification, showing an embodiment of the invention in the form of a trap primer since that is a use to which it is very well adapted. In the drawing,—

Fig. I is a side elevation sectioned in the central portion to show the interior;

Fig. II is a view in orthographic projection of Fig. I showing the end view of the outlet end of the body; and Fig. III is a view of the bottom, in orthographic projection of Fig. I, showing the end view of the trap priming outlet 1a.

In further detailed description of the drawing, 1 represents a body portion for insertion in a fluid flow line, such as the supply pipe to a frequently used fixture such as a kitchen sink, from a source of water under pressure. The body 1 includes a Venturi tube 2 of the meter type that is a part of the flow channel, having the well known ability to change pressure to velocity and then change the velocity back to pressure, without material loss of head, thus rendering a force available, as hereinafter explained, whereby control devices may be definitely and positively operated without placing an obstruction in the main flow channel, such as a plunger with a spring, or other flow impedance.

The Venturi tube 2 is provided with the piezometer opening 3, the size of which is important as will be hereinafter explained. The hole 3 is placed at the point where pressure will be low and velocity will be high when flow is established through the Venturi tube.

Adjacent the piezometer hole 3, is a chamber 4, one wall of which is formed by a flexible diaphragm 10. In the drawing this chamber is shown to be formed in part in the body 1.

The flexible diaphragm 10, as noted, forms one wall of the chamber 4 and likewise acts as a divisional wall between the chamber 4 and another chamber 6, which I have called the pressure chamber because it is furnished with a conduit, such as 7, by which it is kept supplied with fluid under pressure from some point outside of the Venturi influence that affects the chamber 4 when flow through the instrument, from left to right, is taking place; therefore it will always have the pressure of the flow line, within very close limits.

The pressure chamber 6 is provided with an outlet in the form of a short tube 11, at each end of which are valve seats 12 and 42 that are preferably flat and normal to the axis of the tube 11.

Under no flow conditions, water pressure will be communicated to the chamber 4 through the hole 3 and to the pressure chamber 6 through the conduit 7, which is in communication with the water supply line at either end of the Venturi tube 2 though it is shown at the left hand end, and under the conditions illustrated in Fig. I with water pressure in the line and no flow, pressures in chambers 4 and 6 will be identical.

A valve 8 is shown to be attached to and movable with the flexible diaphragm 10 to control the annular opening through the valve seat 12, that is partially filled by the valve stem 13 upon which are mounted, reversely facing valve members 8 and 41. The valve 8 will normally remain seated under no flow conditions due to the unbalanced area of the tube 11, or a bit of the initial resilient springing ability of the flexible diaphragm may be used to positively seat it.

An intermediate opening in the body 1 is designated by the trap pipe connection 1a and the water emitted through the annular space in the tube 11 will flow by gravity to a trap to be primed, through a suitable pipe that is not shown.

The operation of this device is obvious. As soon as a master fixture faucet is opened sufficiently to establish a flow of any considerable amount through the Venturi tube 2, the pressure in the chamber 4 will drop considerably below the pressure in the valve chamber 6, hence the diaphragm 10 is unbalanced and will lift the valve 8 off the seat 12 and the valve 41 into contact with the seat 42, but owing to the small size of the piezometer hole 3, this action is in no sense instantaneous. The chamber 4 is normally filled with water and before the diaphragm can move upward, under the influence of Venturi pressure difference, some water must flow back into the Venturi tube, therefore the size of the piezometer opening 3, is important as a timing device or a hydraulic retarder, to prevent the too sudden shifting of the valve stem 13 and its attached valves 8 and 41. When the valves 8 and 41 are assembled on the stem 13, with each valve adapted to register with its corresponding seat, upon movement of the diaphragm, we have what I have called a double-beat valve.

The double-beat valve may be timed in either or a combination of both of the following ways;— provided the flexibility factor of the diaphragm is not exceeded, the time during which both valves are off their seats will be affected by the distance any valve has to move to close its particular seat, that is by lengthening the portion of the stem 13 between the two valves. A better way is to change the diameter of the piezometer opening 3. I have found that with a normal ½" venturi, where the water pressure varies from say 60 pounds to 80 pounds per square inch, that a drill hole .055" diameter (No. 54 drill) is about right.

When flow ceases, pressure will equalize in the chambers 4 and 6, if the conduit 7 is of a greater capacity than the flow capacity through the tube 11, or its equivalent; hence the valve 8 will again seat on the valve seat 12 after a short interval of time during which flow will take place and the valve 8 will have assumed the function of closing the tube 11 which the valve 41 will relinquish as the pressure in the chamber 4 begins to equalize with that in the chamber 6 and the diaphragm starts down toward the position shown in Fig. I.

1a is a connection within which a trap pipe (not shown) may be fitted to carry the fluid away for trap priming purposes, that may flow past the valves 8 and 41.

As is well known, the tube 11 can be made larger proportionately than shown and with respect to the valve stem 13 so that the annular space is larger, the valve opening may be varied, or in other ways well known to the art.

What I claim as new and desire to secure by Letters Patent, is,—

1. A sampling valve for insertion in a water supply line comprising a body within which is a chamber, a flexible diaphragm forming a wall of said chamber, a Venturi tube in the chamber positioned to affect the diaphragm responsive to flow, a sampling mechanism associated with said body and double beat valve means for controlling said sampling mechanism that are controlled by said diaphragm.

2. In a sampling valve, a body containing a chamber, for insertion in a fluid supply line, a yieldable wall of said chamber that is movable by Venturi pressure difference in the chamber, a Venturi tube comprising part of a flow channel through the body, that is arranged to produce Venturi pressure difference in the chamber, a pressure chamber positioned on the opposite side of the yieldable wall, a conduit from the supply line to the pressure chamber, an outlet from said pressure chamber and a double beat valve associated with the yieldable wall that is effective to control said outlet.

3. In a sampling valve, a Venturi flow passageway, a chamber associated therewith under the Venturi influence of said passageway that is in part bounded by a diaphragm, a pressure chamber associated with the first named chamber that has the said diaphragm as a common wall therebetween, a sampling port in said pressure chamber and a diaphragm controlled double beat valve positioned to control said port.

4. In a sampling valve, a body, a discharge chamber associated with said body, a Venturi tube in said body, a trap pipe connection associated with said discharge chamber by a discharge port between them, a double beat valve for controlling the port and Venturi operated control means for the double beat valve that are responsive to flow through the body, characterized by a hydraulic retarder effective to give the double beat valve a relatively slow motion.

5. In a priming valve, a body for insertion in a fluid flow line, a Venturi tube in said body, a pressure chamber associated with said body, a branch pipe associated with said pressure chamber by a port therebetween, a double beat valve that is operable upon movement thereof to close the port, alternately from opposite sides thereof, a diaphragm movable by energy of flow through the body to operate the valve and a hydraulic timing device for determining the time interval between port closures by the double beat valve.

GEORGE F. McDOUGALL.